United States Patent
Shakushiro et al.

(10) Patent No.: US 10,625,944 B2
(45) Date of Patent: Apr. 21, 2020

(54) PROFILED BELT AND METHOD FOR MANUFACTURING SAME

(71) Applicant: Mitsuboshi Belting Ltd., Kobe-shi, Hyogo (JP)

(72) Inventors: Tomoaki Shakushiro, Hyogo (JP); Akira Takenaka, Hyogo (JP); Takafumi Kumada, Hyogo (JP); Takahide Okazawa, Hyogo (JP)

(73) Assignee: Mitsuboshi Belting Ltd., Kobe-shi, Hyogo (JP)

( * ) Notice: Subject to any disclaimer, the term of this patent is extended or adjusted under 35 U.S.C. 154(b) by 0 days.

(21) Appl. No.: 15/574,188

(22) PCT Filed: Apr. 27, 2016

(86) PCT No.: PCT/JP2016/063234
§ 371 (c)(1),
(2) Date: Nov. 15, 2017

(87) PCT Pub. No.: WO2016/185890
PCT Pub. Date: Nov. 24, 2016

(65) Prior Publication Data
US 2018/0127214 A1    May 10, 2018

(30) Foreign Application Priority Data

May 15, 2015   (JP) .................... 2015-099908
Jun. 29, 2015   (JP) .................... 2015-130348

(51) Int. Cl.
*B65G 15/42*    (2006.01)
*B65G 15/44*    (2006.01)

(52) U.S. Cl.
CPC .................... *B65G 15/44* (2013.01)

(58) Field of Classification Search
CPC ................ B65G 15/42; B65G 15/44
(Continued)

(56) References Cited

U.S. PATENT DOCUMENTS 2,273,627 A        2/1942   Currie
2,809,742 A  *    10/1957   Holz ............... A01D 61/00
                                                                198/697
(Continued)

FOREIGN PATENT DOCUMENTS

CN        2448788 Y       9/2001
CN      101374738 A       2/2009
(Continued)

OTHER PUBLICATIONS

Jan. 22, 2019—(KR) Office Action—App 10-2017-7032825.
(Continued)

*Primary Examiner* — Joseph A Dillon, Jr.
(74) *Attorney, Agent, or Firm* — Banner & Witcoff, Ltd.

(57) ABSTRACT

A profiled belt includes a belt body, a profile that is provided on a back surface of the belt body, and a fixation member that detachably fixes the profile to the belt body. The belt body includes a protrusion on the back surface. The profile includes a recess portion to which the protrusion is fitted. The fixation member fixes the profile to the belt body in a state where the protrusion has been fitted to the recess portion. The fixation member is removably inserted to the profile and the protrusion.

10 Claims, 9 Drawing Sheets

(58) Field of Classification Search
USPC .......................................................... 198/698
See application file for complete search history.

(56) References Cited

U.S. PATENT DOCUMENTS

| | | | | |
|---|---|---|---|---|
| 2,809,743 | A * | 10/1957 | Hinchcliffe | A01D 17/10 |
| | | | | 198/699 |
| 2,987,169 | A * | 6/1961 | Hinchcliffe | B65G 15/42 |
| | | | | 198/699 |
| 3,545,822 | A * | 12/1970 | Gremeret | B62D 55/24 |
| | | | | 305/179 |
| 3,580,388 | A * | 5/1971 | Resener | B65G 15/42 |
| | | | | 198/690.2 |
| 3,805,948 | A * | 4/1974 | Musser | B65G 15/42 |
| | | | | 198/617 |
| 3,981,390 | A * | 9/1976 | Richard | A01D 34/831 |
| | | | | 198/690.2 |
| 4,185,447 | A * | 1/1980 | Howerton | A01D 78/06 |
| | | | | 198/515 |
| 4,202,159 | A * | 5/1980 | Young | A01D 57/00 |
| | | | | 198/697 |
| 4,751,811 | A * | 6/1988 | Groothuis | A01D 89/003 |
| | | | | 198/698 |
| 4,865,182 | A * | 9/1989 | Nolte | B65G 15/42 |
| | | | | 198/699 |
| 4,911,286 | A * | 3/1990 | Herzke | B65G 15/44 |
| | | | | 198/690.2 |
| 5,738,204 | A * | 4/1998 | Baumgartner | B65G 15/44 |
| | | | | 198/732 |
| 6,158,577 | A * | 12/2000 | Tjabringa | A01D 17/10 |
| | | | | 198/698 |
| 6,491,157 | B1 | 12/2002 | Kolling et al. | |
| 7,182,202 | B2 * | 2/2007 | Kalverkamp | B65G 17/02 |
| | | | | 198/698 |
| 8,365,900 | B2 | 2/2013 | Monti | |
| 8,528,726 | B2 * | 9/2013 | Monti | B65G 19/24 |
| | | | | 198/698 |
| 8,960,413 | B2 * | 2/2015 | Umeda | B65G 19/245 |
| | | | | 198/370.02 |
| 9,415,950 | B1 * | 8/2016 | Therrien | B65G 47/841 |
| 10,183,807 | B2 * | 1/2019 | Jager | A01D 61/02 |
| 2004/0238329 | A1 * | 12/2004 | Verdigets | B65G 17/08 |
| | | | | 198/698 |
| 2009/0266685 | A1 * | 10/2009 | Zhang | B65G 15/42 |
| | | | | 198/822 |
| 2011/0108390 | A1 | 5/2011 | Monti et al. | |
| 2012/0217139 | A1 * | 8/2012 | Boucher | A44B 19/26 |
| | | | | 198/844.2 |
| 2017/0081124 | A1 * | 3/2017 | Steinert | B65G 39/20 |
| 2017/0113876 | A1 * | 4/2017 | Jager | A01D 61/02 |
| 2017/0190512 | A1 * | 7/2017 | DeGraw | B65G 21/00 |
| 2017/0334651 | A1 * | 11/2017 | Miller | B65G 15/58 |
| 2018/0127214 | A1 | 5/2018 | Shakushiro et al. | |
| 2018/0209096 | A1 * | 7/2018 | Burazin | B65G 15/42 |

FOREIGN PATENT DOCUMENTS

| | | |
|---|---|---|
| CN | 105329616 A | 2/2016 |
| DE | 29605872 U1 | 8/1996 |
| EP | 1092657 A1 | 4/2001 |
| EP | 2319779 A1 | 5/2011 |
| EP | 2364934 A1 | 9/2011 |
| EP | 3296234 A1 | 3/2018 |
| FR | 2427276 A1 | 12/1979 |
| JP | S59-057410 U | 4/1984 |
| JP | S60-078310 | 5/1985 |
| JP | H02-069611 A | 3/1990 |
| JP | H02-069611 U | 5/1990 |
| JP | H05-064114 U | 8/1993 |
| JP | H0769416 A | 3/1995 |
| JP | H11-319725 A | 11/1999 |
| JP | 2001-122415 A | 5/2001 |
| JP | 2002087567 A | 3/2002 |
| JP | 2003-063630 A | 3/2003 |
| JP | 3449415 B2 | 9/2003 |
| JP | 2004059271 A | 2/2004 |
| JP | 2005-114175 A | 4/2005 |
| JP | 2005145568 A | 6/2005 |
| JP | 2014185007 A | 10/2014 |

OTHER PUBLICATIONS

Oct. 8, 2018—(CN) Notification of First Office Action—App 201680027665.9.
Dec. 12, 2018—(EP) Extended search report—App 16796284.4.
Jul. 12, 2016—International Search Report—Intl App PCT/JP2016/063234.
Nov. 14, 2018—(CA) Office Action—App 2,985,035.
Feb. 5, 2019—(JP) Notification of Reasons for Refusal—App 2015-130348.
Mar. 5, 2019—(JP) Notification of Reasons for Refusal—App 2015-130348.
May 17, 2019—(CN) Notification of the Second Office Action—App 201680027665.9.
Jul. 29, 2019—(KR) Decision to Refuse a Patent—App 10-2017-7032825.
Sep. 18, 2019—(KR) Decision to Refuse a Patent—App 10-2017-7032825.
Nov. 25, 2019—(CN) Notification of the Third Office Action—App 201680027665.9.

* cited by examiner

FIG. 7
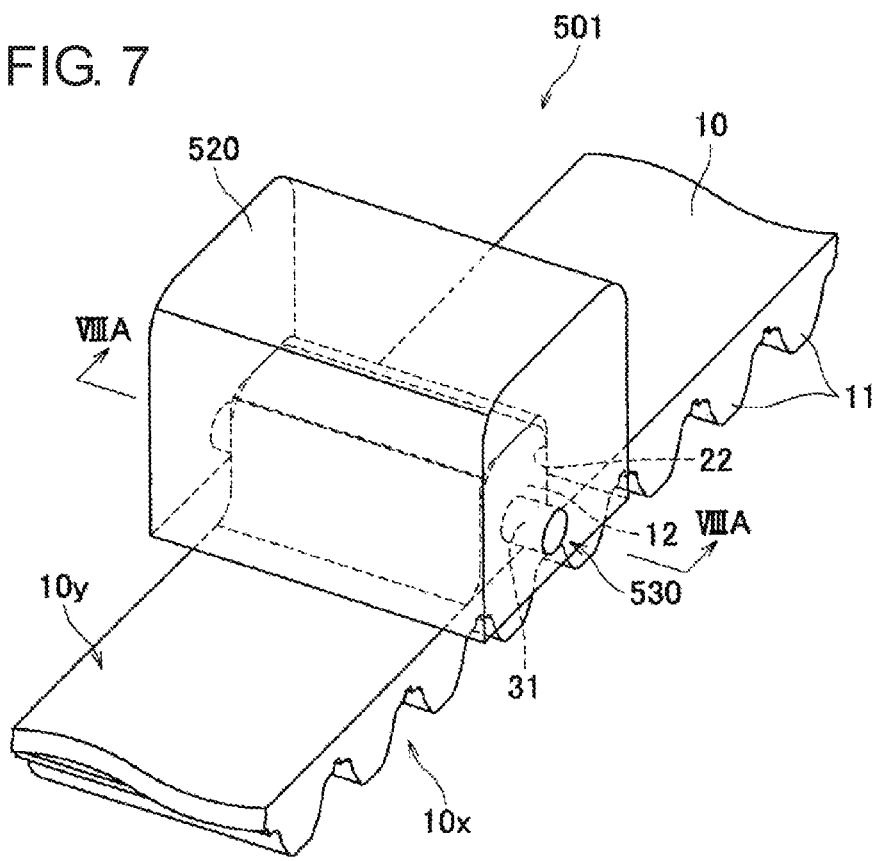
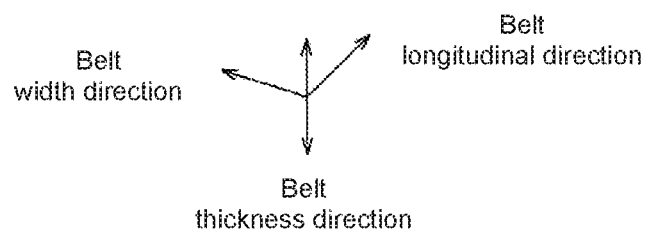

PROFILED BELT AND METHOD FOR MANUFACTURING SAME

CROSS REFERENCE TO RELATED APPLICATIONS:

This is a U.S. National Phase Application under 35 U.S.C. § 371 of International Application No. PCT/JP2016/063234, filed Apr. 27, 2016, which claims priority to Japanese Application Nos. 2015-099908 filed May 15, 2015 and 2015-130348 filed Jun. 29, 2015, which was published Under PCT Article 21(2), the entire contents of which are incorporated herein by reference.

TECHNICAL FIELD

The present invention relates to a profiled belt that includes a belt body and a profile provided on a back surface of the belt body, and a manufacturing method of the same belt.

BACKGROUND ART

It has been known that a convex profile is provided on a back surface of a belt body of a toothed belt, a flat belt or the like, so that conveyance, arrangement, sorting, etc. of articles can be performed by profile. In addition, as a method for providing the profile on the back surface of the belt body, there have been known some methods, including a method for welding/fusing the profile to the back surface of the belt body (see Patent Literature 1), a method in which a deleted portion (hole) is provided in the belt body, and a connection portion is charged into the deleted portion or a lock pin is provided in the deleted portion (see Patent Literature 2), a method in which the belt body and the profile are molded integrally (see Patent Literature 3), a method in which the profile is outsert-molded on a support protrusion portion provided on the back surface of the belt body (see Patent Literature 4), etc.

CITATION LIST

Patent Literature

Patent Literature 1: JP-UM-A-5-64114
Patent Literature 2: JP-A-2003-63630
Patent Literature 3: JP-A-2001-122415
Patent Literature 4: JP-A-2005-114175

SUMMARY OF INVENTION

Problem that the Invention is to Solve

In the method according to Patent Literature 1, selection of a material of the profile is restricted, and the profile cannot be replaced. In the method according to Patent Literature 2, strength of the belt body is reduced by the hole provided in the belt body. Particularly when a tension member embedded in the belt body is cut due to the formation of the hole, the strength of the belt body can be reduced on a large scale. In the methods according to the Patent Literatures 3 and 4, it is necessary to prepare a mold for molding the belt body and the profile. It is therefore difficult to reduce the manufacturing cost, and it is also difficult to cope with a change in shape or size of the belt body or the profile.

An object of the present invention is to provide a profiled belt and a manufacturing method thereof, in which selection of a material of a profile is not restricted excessively, the profile can be replaced, while reduction in strength of a belt body can be suppressed, and it is easy to reduce the manufacturing cost and cope with a change in shape or size of the belt body or the profile.

Means for Solving the Problem

According to a first aspect of the present invention, there is provided a profiled belt including a belt body, a profile that is provided on a back surface of the belt body, and a fixation member that detachably fixes the profile to the belt body, wherein the belt body includes a protrusion on the back surface, the profile includes a recess portion to which the protrusion is fitted, the fixation member fixes the profile to the belt body in a state where the protrusion has been fitted to the recess portion, and the fixation member is removably inserted to the profile and the protrusion.

According to a second aspect of the present invention, there is provided a method for manufacturing a profiled belt including a belt body, a profile that is provided on a back surface of the belt body, and a fixation member that detachably fixes the profile to the belt body, the method comprising a belt body production step of producing the belt body including a protrusion on the back surface, a profile production step of producing the profile including a recess portion to which the protrusion is fitted, and a fixation step of fixing the profile to the belt body by use of the fixation member in a state where the protrusion has been fitted to the recess portion, wherein in the fixation step, the fixation member is removably inserted to the profile and the protrusion so that the profile is detachably fixed to the belt body by the fixation member.

According to the aforementioned first and second aspects, which have not a configuration in which a profile is welded/fused but a configuration in which a profile is detachably fixed to a belt body by a fixation member, selection of a material of the profile is not restricted excessively, and the profile can be replaced (for example, a profile reaching the end of its lifetime can be replaced by a new one). In addition, it is not necessary to provide a hole in the belt body. Therefore, reduction in strength of the belt body is suppressed. Further, an expensive mold is not required. It is therefore easy to reduce the manufacturing cost and deal with a change in shape or size of the belt body or the profile.

The protrusion may be provided on the back surface by integral molding.

According to the aforementioned configuration, the protrusion is hardly detached from the belt body, as compared with such a case that the protrusion is bonded to the belt body. Thus, the profile can be more surely fixed to the belt body through the protrusion.

The fixation member may include an extension portion that extends in a parallel direction parallel to the back surface and that penetrates the profile and the protrusion.

According to the aforementioned configuration, the profile can be more surely fixed to the belt body by use of the fixation member.

The fixation member may include a plurality of the extension portions, and a connection portion that connects one ends of the plurality of the extension portions in the parallel direction.

According to the aforementioned configuration, the extension portions are provided so that the profile can be more surely fixed to the belt body. In addition, the connection portion is provided so that the fixation member can be prevented from moving in a direction from the one end toward the other end of the extension portions. It is therefore possible to more surely prevent the fixation member from coming off, and hence it is possible to more surely fix the profile to the belt body.

The profile may include a connection portion receiving portion that receives the connection portion.

According to the aforementioned configuration, contact between the fixation member and another component is suppressed. It is therefore possible to more surely prevent the fixation member from coming off, and hence it is possible to more surely fix the profile to the belt body.

The protrusion may be longer in one direction of a longitudinal direction and a width direction of the belt body than in the other direction, and the parallel direction may be the one direction.

According to the aforementioned configuration, the extension portion is extended in a longitudinal direction of the protrusion so that the holding force of the profile to the protrusion can be improved, as compared with a case where the extension portion is extended in a lateral direction of the protrusion.

The fixation member may further include an expansion portion that is provided in an end portion of the extension portion in the parallel direction, the end portion being not connected to another element, and that has a size in a perpendicular direction perpendicular to the parallel direction being larger at least in a part to be connected to the end portion than a size of the end portion in the perpendicular direction.

According to the aforementioned configuration, it is possible to more surely prevent the fixation member from coming off, and hence it is possible to more surely fix the profile to the belt body.

The profile may include an expansion portion receiving portion that receives the expansion portion.

According to the aforementioned configuration, contact between the fixation member and another component is suppressed. It is therefore possible to more surely prevent the fixation member from coming off, and hence it is possible to more surely fix the profile to the belt body.

The expansion portion may have a size in the perpendicular direction being reduced as going in the parallel direction away from the end portion of the extension portion, and the size in the perpendicular direction of the expansion portion at the furthest end in the parallel direction from the end portion of the extension portion is equal to the size of the extension portion in the perpendicular direction or smaller than the size.

According to the aforementioned configuration, it is possible to easily perform work of inserting the fixation member into the profile and the protrusion from the end of the expansion portion, and hence it is possible to easily perform work of attaching the profile to the belt body.

The fixation member may be made of metal.

According to the aforementioned configuration, the fixation member can be deformed comparatively easily. It is therefore possible to form the extension portion easily.

It is preferable that the fixation member does not protrude from an external surface of the profile.

According to the aforementioned configuration, contact between the fixation member and another component is suppressed. It is therefore possible to more surely prevent the fixation member from coming off, and hence it is possible to more surely fix the profile to the belt body.

Advantage of the Invention

The present invention provides not a configuration in which a profile is welded/fused but a configuration in which a profile is detachably fixed to a belt body by a fixation member. Accordingly, selection of a material of the profile is not restricted excessively, but the profile can be replaced (for example, a profile reaching the end of its lifetime can be replaced by a new one). In addition, it is not necessary to provide a hole in the belt body. Therefore, reduction in strength of the belt body is suppressed. Further, an expensive mold is not required. It is therefore easy to reduce the manufacturing cost and deal with a change in shape or size of the belt body or the profile.

BRIEF DESCRIPTION OF THE DRAWINGS

FIG. 7 is a partially perspective view showing a profiled belt according to a fifth embodiment of the present invention.

Figure 8:
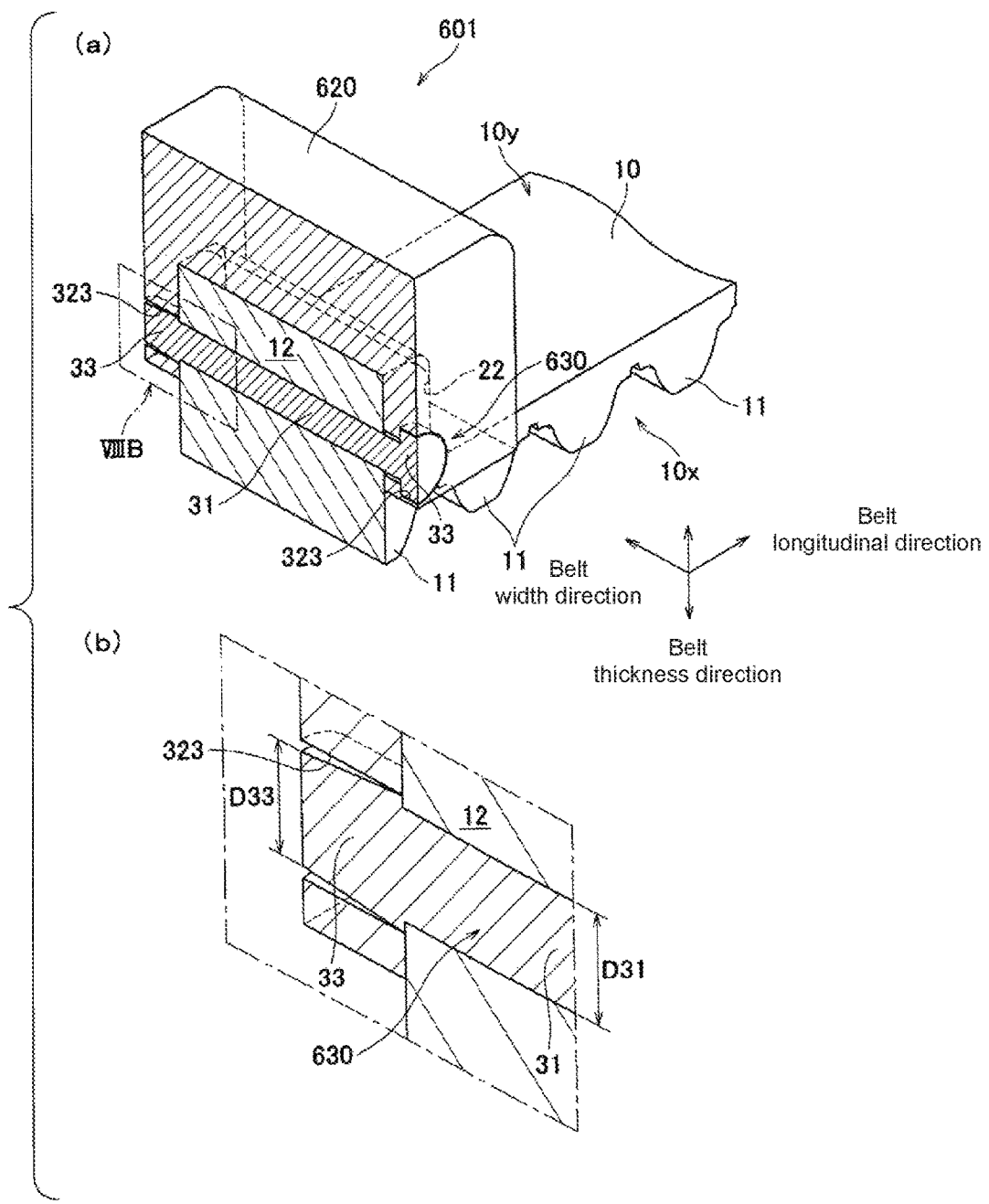

The part (a) of FIG. 8 is a partially sectional perspective view taken along line VIIIA to VIIIA in FIG. 7, showing a profiled belt according to a sixth embodiment of the present invention, and the part (b) of FIG. 8 is an enlarged view of a part VIIIB shown in the part (a) of FIG. 8.

Figure 9:
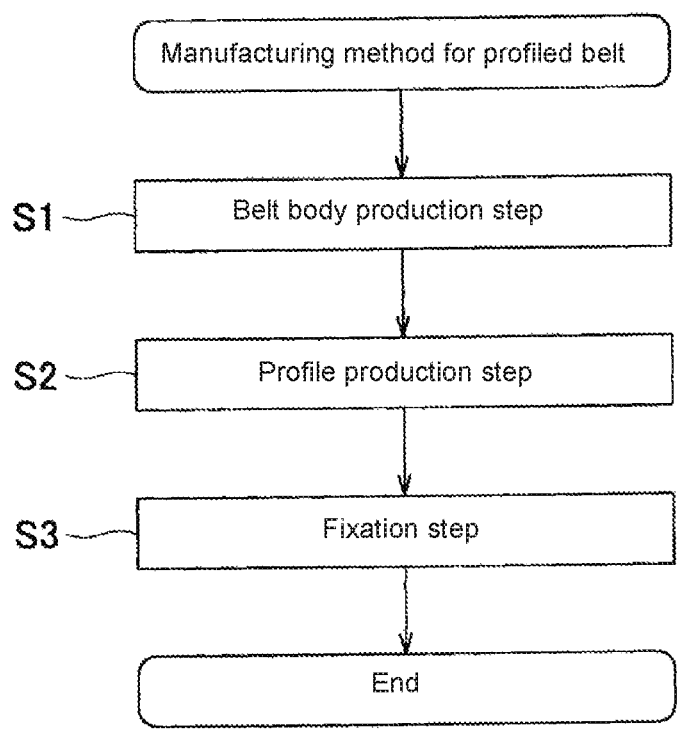

FIG. 9 is a flow chart showing an embodiment of a method for manufacturing a profiled belt according to the present invention.

MODE FOR CARRYING OUT THE INVENTION

A profiled belt 1 according to a first embodiment of the present invention includes an endless (annular) belt body 10, and a plurality of profiles 20 provided on a back surface 10y of the belt body 10. The profiles 20 are provided at predetermined intervals in a longitudinal direction of the belt body 10 (hereinafter referred to as "belt longitudinal direction"). The profiled belt 1 is, for example, wound around a driving pulley 51 and a driven pulley 52 so that the profiled belt 1 can run in accordance with the rotation of the driving pulley 51 and the driven pulley 52.

The belt body 10 is made of an elastic material (such as elastomer of polyurethane), and formed by cast molding or the like. The belt body 10 is a toothed belt, in which a plurality of teeth 11 are provided in an inner surface 10x. The teeth 11 extend in a width direction of the belt body 10 (hereinafter referred to as "belt width direction"), and arranged at predetermined intervals in the belt longitudinal direction so as to be spaced from one another. In addition, the belt body 10 includes a tension member (not shown) extending in the belt longitudinal direction.

Figure 1:
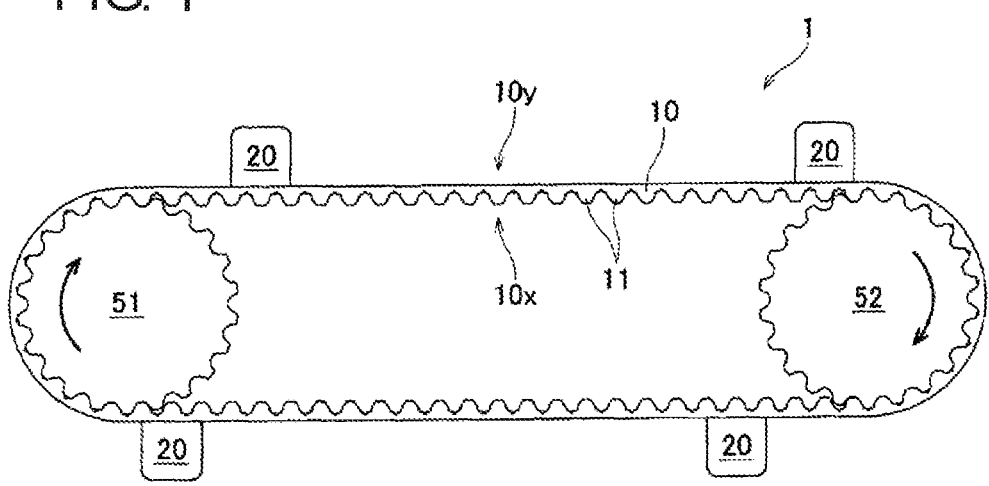
FIG. 1 is a schematic view showing a state in which a profiled belt according to a first embodiment of the present invention has been wound around a driving pulley and a driven pulley.
Figure 2:
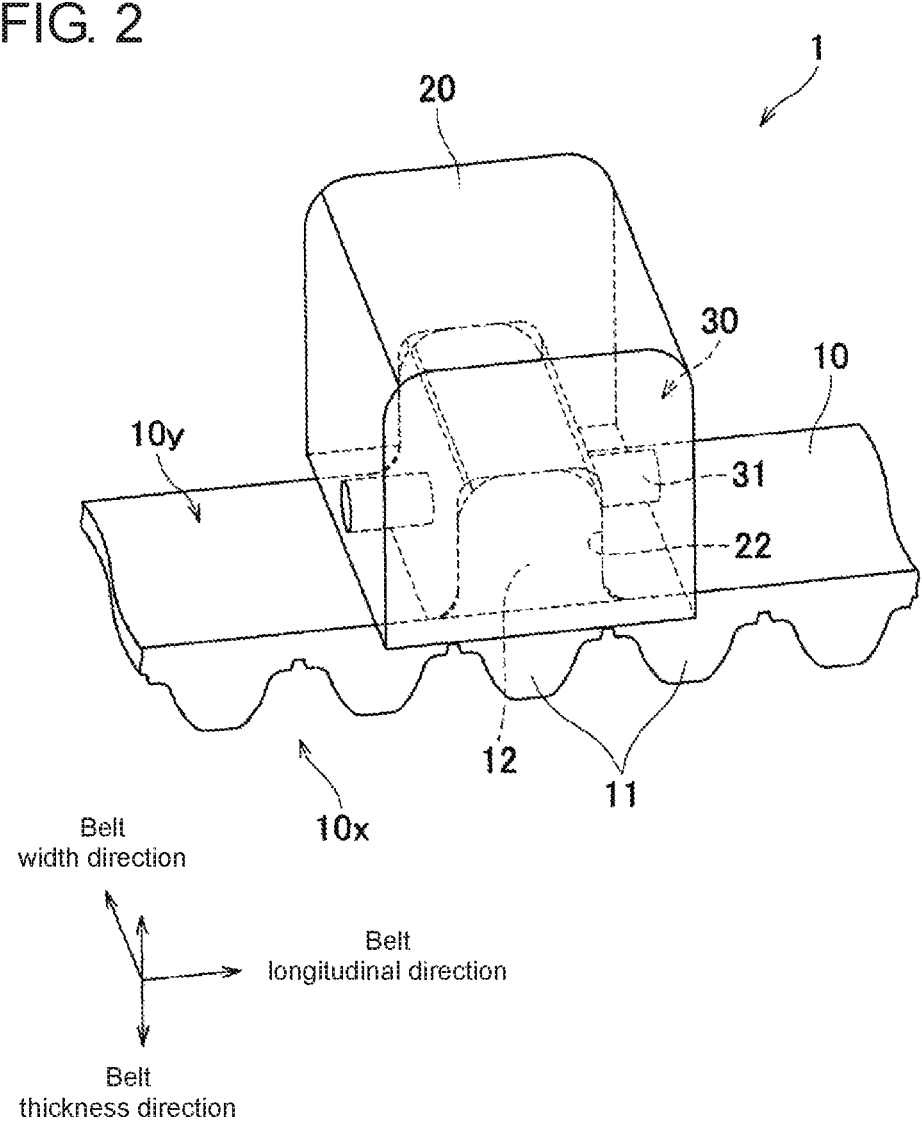
FIG. 2 is a partially perspective view showing the profiled belt according to the first embodiment of the present invention.

The belt body 10 has a plurality of protrusions 12 (see FIG. 2) on the back surface 10y. The protrusions 12 are provided to correspond to each of profiles 20 one by one. The protrusions 12 are arranged at predetermined intervals in the belt longitudinal direction so as to be spaced from one another. The protrusions 12 are provided on the back surface 10y by integral molding. The protrusion 12 has a length equal to the belt body 10 in the belt width direction.

The profile 20 is made of resin (such as ABS resin), and includes a recess portion 22 to which the protrusion 12 is fitted. The recess portion 22 is open to a bottom surface (which is a surface facing the back surface 10y) of the profile 20. The profile 20 may be, for example, formed by injection molding, or may be formed in such a manner that a profile precursor having no recess portion 22 is formed and the recess portion 22 is then formed in the precursor by cutting.

A through hole that a fixation member 30 penetrates is formed in advance in each of the profile 20 and the protrusion 12. The through hole penetrates the profile 20 and the protrusion 12 in the belt longitudinal direction and at their centers in the belt width direction respectively.

The fixation member 30 is a rod-like member made of metal (such as iron or aluminum). The fixation member 30 includes an extension portion 31 extending in a parallel direction (corresponding to the belt longitudinal direction in the embodiment) parallel to the back surface 10y and penetrating the profile 20 and the protrusion 12. The extension portion 31 is a columnar member having a constant diameter and penetrates the through hole formed in advance in the profile 20 and the protrusion 12. The fixation member 30 does not protrude from an external surface of the profile 20.

The fixation member 30 serves to fix the profile 20 to the belt body 10 in a state where the protrusion 21 has been fitted to the recess portion 22. The fixation member 30 is removably inserted to the profile 20 and the protrusion 12. By the fixation member 30, the profile 20 is detachably fixed to the belt body 10.

In order to attach the profile 20 to the belt body 10, first, the profile 20 is moved relatively to the belt body 10 in a direction from the back surface 10y toward the inner surface 10x so that the protrusion 12 can be fitted to the recess portion 22. The profile 20 is disposed thus on the back surface 10y. After that, the fixation member 30 is inserted in the belt longitudinal direction from a lateral side of the profile 20 so as to penetrate the profile 20 and the protrusion 12. As a result, the profile 20 is fixed to the belt body 10.

In order to remove the profile 20 from the belt body 10, first, the fixation member 30 is moved relatively to the profile 20 in the belt longitudinal direction. Thus, the fixation member 30 is extracted to the outside of the profile 20. After that, the profile 20 is moved relatively to the belt body 10 in a direction from the inner surface 10x toward the back surface 10y so that the profile 20 is separated from the belt body 10. As a result, the profile 20 is removed from the belt body 10.

As described above, the embodiment provides not a configuration in which the profile 20 is welded/fused but a configuration in which the profile 20 is detachably fixed to the belt body 10 by the fixation member 30. Accordingly, selection of a material of the profile 20 is not restricted excessively, but the profile 20 can be replaced (for example, the profile 20 reaching the end of its lifetime can be replaced by a new one). In addition, it is not necessary to provide a hole in the belt body 10. Therefore, reduction in strength of the belt body 10 is suppressed. Further, an expensive mold is not required. It is therefore easy to reduce the manufacturing cost and deal with a change in shape or size of the belt body 10 or the profile 20.

The protrusion 12 is provided on the back surface 10y by integral molding.

According to the aforementioned configuration, the protrusion 12 is hardly detached from the belt body 10, as compared with such a case that the protrusion 12 is bonded to the belt body 10. Thus, the profile 20 can be more surely fixed to the belt body 10 through the protrusion 12.

The fixation member 30 includes an extension portion 31 extending in a parallel direction (corresponding to the belt longitudinal direction in the embodiment) parallel to the back surface 10y and penetrating the profile 20 and the protrusion 12.

According to the aforementioned configuration, it is possible to more surely fix the profile 20 to the belt body 10 by use of the fixation member 30.

The fixation member 30 does not protrude from the external surface of the profile 20.

According to the aforementioned configuration, contact between the fixation member 30 and another component is suppressed. It is therefore possible to more surely prevent the fixation member 30 from coming off, and hence it is possible to more surely fix the profile 20 to the belt body 10.

Figure 3:
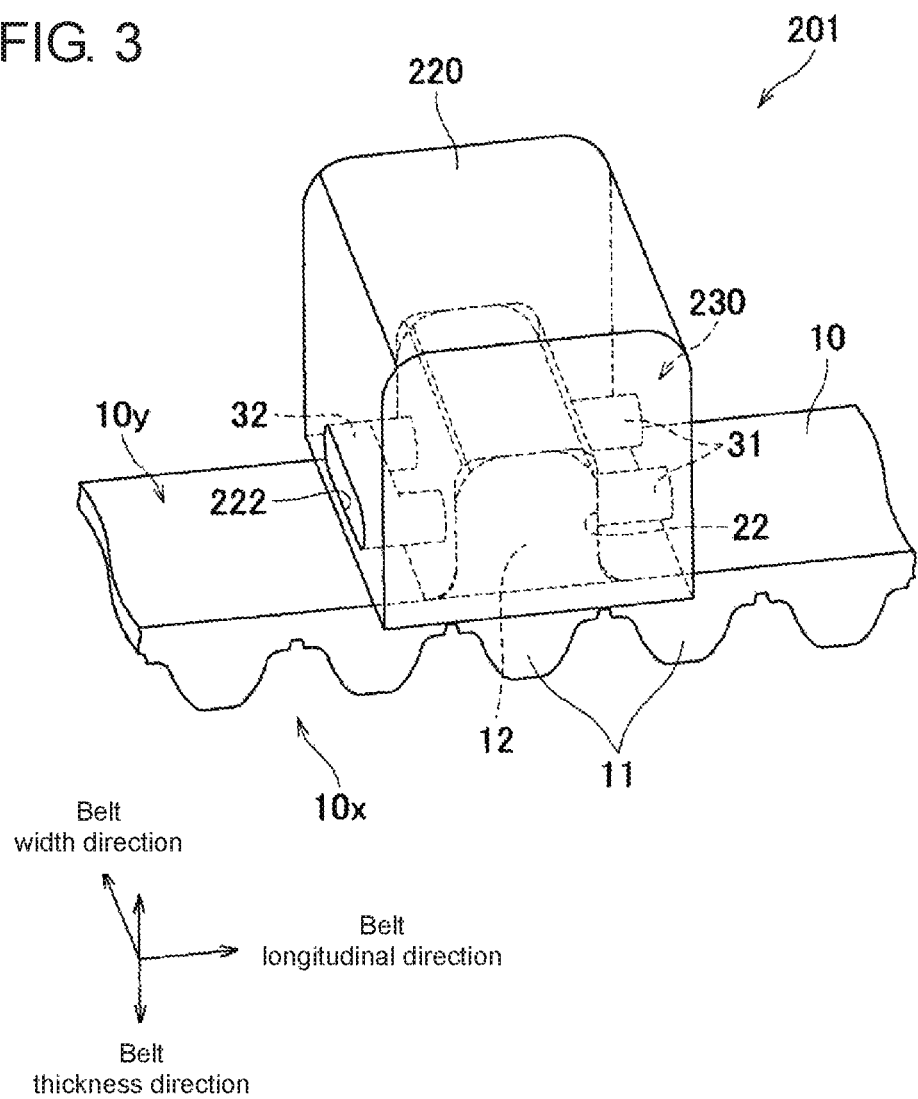
FIG. 3 is a partially perspective view showing a profiled belt according to a second embodiment of the present invention.

Next, a profiled belt 201 according to a second embodiment of the present invention will be described with reference to FIG. 3. Constituent elements the same as those in the first embodiment will be referenced correspondingly, and their description will be omitted accordingly.

The profiled belt 201 includes a belt body 10, a plurality of profiles 220 provided on a back surface 10y of the belt body 10, and a fixation member 230 for detachably fixing the profile 220 to the belt body 10.

The fixation member 230 is a U-shaped member made of metal (such as iron or aluminum). The fixation member 230 includes two extension portions 31, and a connection portion 32 that connects one ends of the two extension portions 31 in the parallel direction (corresponding to the belt longitudinal direction in the embodiment). The connection portion 32 extends in a direction (corresponding to the belt width direction in the embodiment) parallel with the back surface 10y and perpendicular to the parallel direction.

The profile 220 has, in addition to a recess portion 22, a connection portion receiving portion 222 that receives the connection portion 32. The connection portion receiving portion 222 is open to one side surface (one side surface extending in the belt width direction) of the profile 220 in the belt longitudinal direction.

The fixation member 230 does not protrude from an external surface of the profile 220, in the same manner as in the first embodiment.

In order to attach the profile 220 to the belt body 10, first, the profile 220 is moved relatively to the belt body 10 in a direction from the back surface 10y toward the inner surface 10x so that the protrusion 12 can be fitted to the recess portion 22, in the same manner as in the first embodiment. The profile 220 is disposed thus on the back surface 10y. After that, the fixation member 230 is moved relatively to the profile 220 in a direction from an one end side (end portions where the connection portion 32 is provided) of the two extension portions 31 toward the other end side in the belt longitudinal direction, and inserted in the belt longitudinal direction from a lateral side (a lateral side where the connection portion receiving portion 222 is open) of the profile 220 so as to penetrate the profile 220 and the protrusion 12. As a result, the profile 220 is fixed to the belt body 10.

In order to remove the profile 220 from the belt body 10, first, the fixation member 230 is moved relatively to the profile 220 in a direction from the other end side of the two extension portions 31 toward the one end side (the end portions where the connection portion 32 is provided) in the belt longitudinal direction. Thus, the fixation member 230 is extracted to the outside of the profile 220. After that, the profile 220 is moved relatively to the belt body 10 in a direction from the inner surface 10x toward the back surface 10y so that the profile 220 is separated from the belt body 10. As a result, the profile 220 is removed from the belt body 10.

As described above, according to the embodiment, the following effects can be obtained as well as similar effects to those of the first embodiment based on the similar configuration to that of the first embodiment.

The fixation member 230 includes the two extension portions 31, and the connection portion 32 that connects one ends of the two extension portions 31 in the parallel direction (corresponding to the belt longitudinal direction in the embodiment).

According to the aforementioned configuration, the two extension portions 31 are provided so that the profile 220 can be more surely fixed to the belt body 10. In addition, since the connection portion 32 is provided, the fixation member 230 can be prevented from moving in a direction from the one end side (end portions where the connection portion 32 is provided) toward the other end side of the extension portions 31 in the parallel direction (corresponding to the belt longitudinal direction in the embodiment). Thus, it is possible to more surely prevent the fixation member 230 from coming off, and hence it is possible to more surely fix the profile 220 to the belt body 10.

The profile 220 includes the connection portion receiving portion 222 for receiving the connection portion 32.

According to the aforementioned configuration, contact between the fixation member 230 and another component is suppressed. It is therefore possible to more surely prevent the fixation member 230 from coming off, and hence it is possible to more surely fix the profile 220 to the belt body 10.

Next, a profiled belt 301 according to a third embodiment of the present invention will be described with reference to FIG. 4. Constituent elements the same as those in the first embodiment will be referenced correspondingly, and their description will be omitted accordingly.

The profiled belt 301 includes a belt body 10, a plurality of profiles 320 provided on a back surface 10y of the belt body 10, and a fixation member 330 for detachably fixing the profile 320 to the belt body 10.

The fixation member 330 is a rod-like member made of metal (such as iron or aluminum) in the same manner as in the first embodiment. The fixation member 330 includes one extension portion 31.

The fixation member 330 further includes expansion portions 33 provided on both ends of the extension portion 31 in the parallel direction (corresponding to the belt longitudinal direction in the embodiment). The both ends of the extension portion 31 are not connected to any other elements.

Each expansion portion 33 has a size in a perpendicular direction (corresponding to the belt width direction and/or the belt thickness direction in the embodiment) perpendicular to the parallel direction being larger at least in a part to be connected to the end portion (one end or the other end of the extension portion 31 in the belt longitudinal direction). The expansion portion 33 provided at one end (left side in FIG. 4) of the extension portion 31 in the belt longitudinal direction has a columnar shape having a larger diameter than a diameter of the extension portion 31. The expansion portion 33 provided at the other end (right side in FIG. 4) of the extension portion 31 in the belt longitudinal direction has a shape bent in the belt width direction from the other end of the extension portion 31.

The profile 320 has, in addition to a recess portion 22, expansion portion receiving portions 323 that receive each expansion portion 33. The expansion portion receiving portions 323 are open to both side surfaces (two side surfaces extending in the belt width direction) of the profile 320 in the belt longitudinal direction.

The fixation member 330 does not protrude from an external surface of the profile 220, in the same manner as in the first embodiment.

The fixation member 330 may be manufactured as follows. A member having no expansion portion 33 as in the fixation member 30 according to the first embodiment is used as a fixation member precursor, and the precursor is made to penetrate the profile 320 and the protrusion 12. After that, the expansion portions 33 are formed at both ends of the extension portion 31 of the precursor in the belt longitudinal direction by a desired method (for example, by use of a pair of pressing jigs 500 shown in FIG. 6). Alternatively, the fixation member 330 may be produced as follows. A member provided with only one expansion portion 33 in the fixation member 30 according to the first embodiment is used as a fixation member precursor, and the precursor is made to penetrate the profile 320 and the protrusion 12. After that, the other expansion portion 33 is formed at an end of the extension portion 31 of the precursor where the expansion portion 33 has not been provided yet, by a desired method.

In order to attach the profile 320 to the belt body 10, first, the profile 320 is moved relatively to the belt body 10 in a direction from the back surface 10y toward the inner surface 10x so that the protrusion 12 can be fitted to the recess portion 22, in the same manner as in the first embodiment. The profile 320 is disposed thus on the back surface 10y. After that, a fixation member precursor as described above is inserted in the belt longitudinal direction from a lateral side of the profile 320 so as to penetrate the profile 320 and the protrusion 12. Further after that, the expansion portion 33 is formed as described above and the fixation member 330 having the expansion portions 33 at the both ends of the extension portion 31 in the belt longitudinal direction is produced so that the profile 320 is fixed to the belt body 10.

Figure 4:
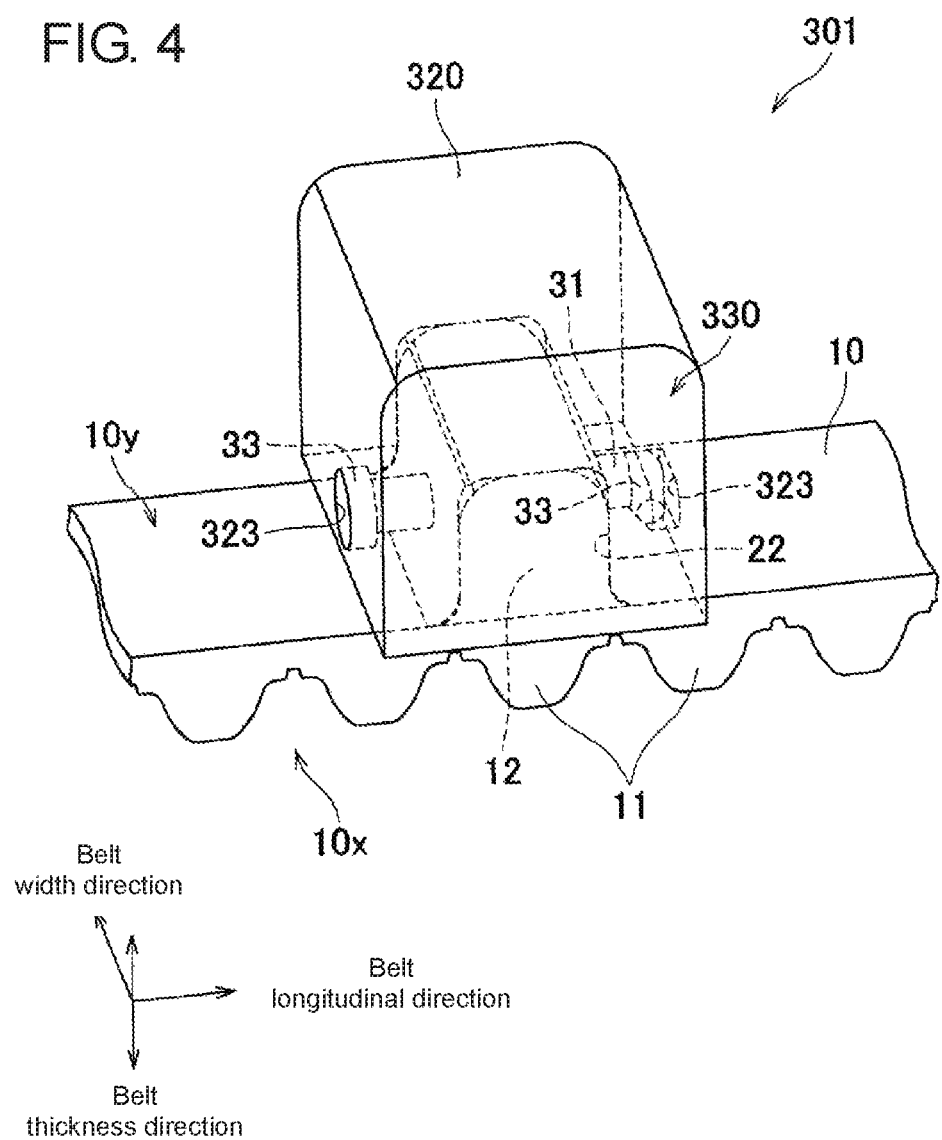
FIG. 4 is a partially perspective view showing a profiled belt according to a third embodiment of the present invention.

In order to remove the profile 320 from the belt body 10, first, of the two expansion portions 33 provided in the fixation member 330, the right side one in FIG. 4 is bent to extend in the belt longitudinal direction, and the fixation member 330 which does not have one of the expansion portions 33 is moved relatively to the profile 320 in the belt longitudinal direction. Thus, the fixation member 330 is extracted to the outside of the profile 320. After that, the profile 320 is moved relatively to the belt body 10 in a direction from the inner surface 10x toward the back surface 10y so that the profile 320 is separated from the belt body 10. As a result, the profile 320 is removed from the belt body 10.

As described above, according to the embodiment, the following effects can be obtained as well as similar effects to those of the first embodiment based on the similar configuration to that of the first embodiment.

The fixation member 330 further includes the expansion portion 33 that is provided in an end portion of the extension portion 31 in the parallel direction (corresponding to the belt longitudinal direction in the embodiment), the end portion being not connected to another element, and that has a size in a perpendicular direction (corresponding to the belt width direction and/or the belt thickness direction in the embodiment) perpendicular to the parallel direction being larger at least in a part to be connected to the end portion than a size of the end portion in the perpendicular direction.

According to the aforementioned configuration, it is possible to more surely prevent the fixation member 330 from coming off, and hence it is possible to more surely fix the profile 320 to the belt body 10.

The profile 320 includes the expansion portion receiving portion 323 for receiving the expansion portion 33.

According to the aforementioned configuration, contact between the fixation member 330 and another component is suppressed. It is therefore possible to more surely prevent the fixation member 330 from coming off, and hence it is possible to more surely fix the profile 320 to the belt body 10.

The fixation member 330 is made of metal.

According to the aforementioned configuration, the fixation member 330 can be deformed comparatively easily. It is therefore possible to form the expansion portions 33 easily.

Figure 5:
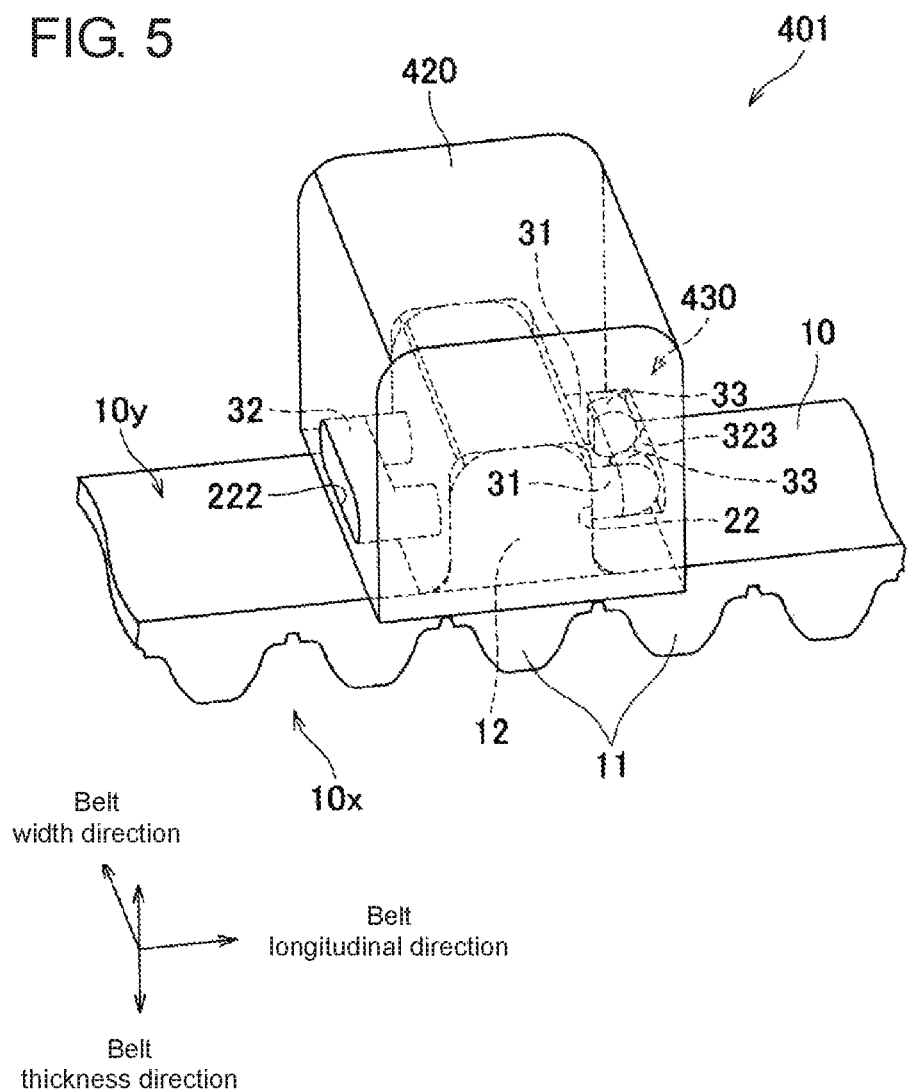
FIG. 5 is a partially perspective view showing a profiled belt according to a fourth embodiment of the present invention.

Next, a profiled belt 401 according to a fourth embodiment of the present invention will be described with reference to FIG. 5. Constituent elements the same as those in the first, second or third embodiment will be referenced correspondingly, and their description will be omitted accordingly.

The profiled belt 401 includes a belt body 10, a plurality of profiles 420 provided on a back surface 10y of the belt body 10, and a fixation member 430 for detachably fixing the profile 420 to the belt body 10.

The fixation member 430 is a U-shaped member made of metal (such as iron or aluminum) in the same manner as in the second embodiment and includes two extension portions 31, and a connection portion 32 that connects one ends of the two extension portions 31 in a parallel direction (corresponding to the belt longitudinal direction in the embodiment).

The fixation member 430 includes an expansion portion 33 provided at the other end of each extension portion 31 in the parallel direction (corresponding to the belt longitudinal direction in the embodiment). The other end of each extension portion 31 in the belt longitudinal direction has not been connected to another element.

Each expansion portion 33 has a size in a perpendicular direction (corresponding to the belt width direction in the embodiment) perpendicular to the parallel direction being larger at least in a part to be connected to the end portion (the other end of the extension portion 31 in the parallel direction) than a size (the diameter of the extension portion 31) of the end portion in the perpendicular direction. Each expansion portion 33 is bent in the belt width direction from the other end of the extension portion 31 in the belt longitudinal direction so as to extend in the belt width direction to approach the other expansion portion 33.

The profile 420 has, in addition to a recess portion 22, a connection portion receiving portion 222 that receives the connection portion 32 and an expansion portion receiving portion 323 that receives the two expansion portions 33.

The fixation member 430 does not protrude from an external surface of the profile 420, in the same manner as in the first embodiment.

The fixation member 430 may be manufactured as follows. A member having no expansion portion 33 as in the fixation member 230 according to the second embodiment is used as a fixation member precursor 430x (see FIG. 6), and the fixation member precursor 430x is made to penetrate the profile 420 and the protrusion 12. After that, the expansion portion 33 is formed at the other end of the extension portion 31 of the fixation member precursor 430x in the belt longitudinal direction by a desired method (for example, by use of a pair of pressing jigs 500 shown in FIG. 6).

Figure 6:
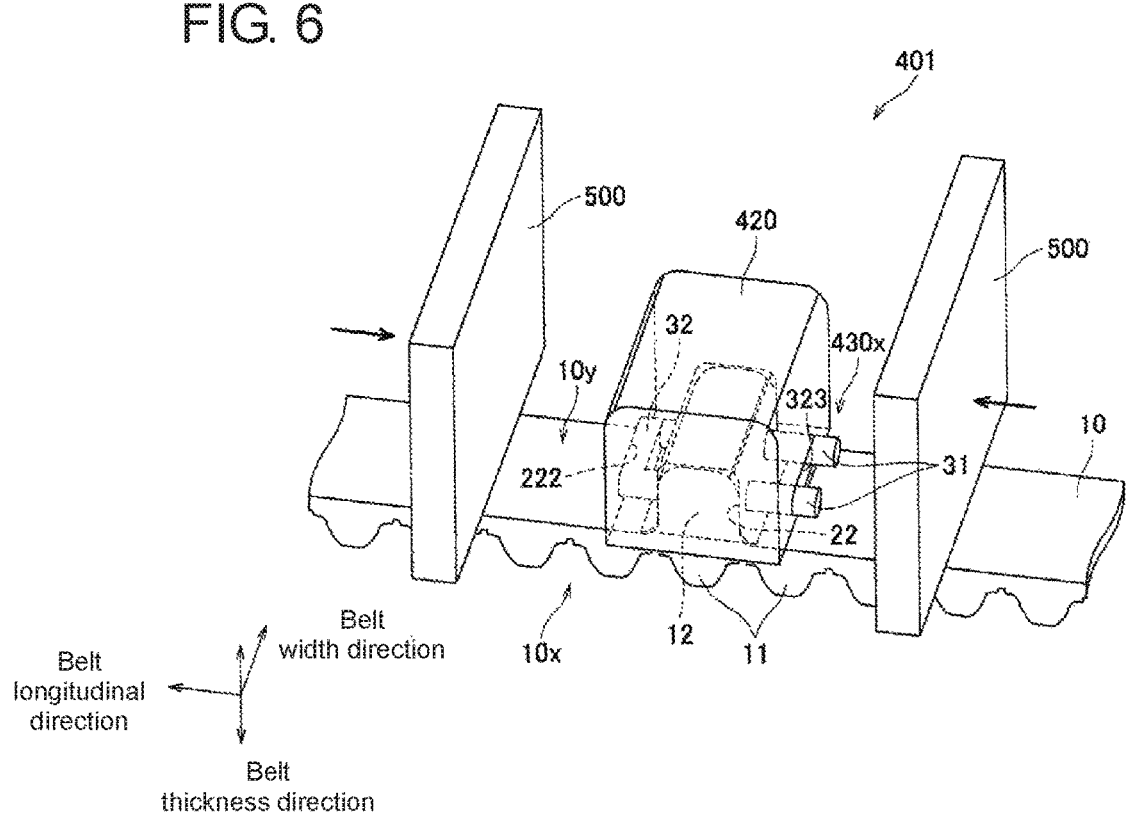
FIG. 6 is a partially perspective view showing an example of a step of forming extension portions in the profiled belt according to the fourth embodiment of the present invention.

Specifically as for FIG. 6, the pair of pressing jigs 500 are brought into press contact with both side surfaces (two side surfaces extending in the belt width direction) of the profile 420 in the belt longitudinal direction so that the profile 420 can be held in the belt longitudinal direction between the pair of pressing jigs 500 to form the expansion portion 33 at the other end of the extension portion 31 of the fixation member precursor 430x in the belt longitudinal direction. From the standpoint of making it easy to form the expansion portion 33, of the pair of pressing jigs 500, the pressing jig 500 facing the other end of the extension portion 31 of the fixation member precursor 430x in the belt longitudinal direction may have a recess portion in a surface facing the other end, the recess portion being similar to a recess portion provided at a place where two end portions of a U-shaped needle of a stapler have been bent.

In order to attach the profile 420 to the belt body 10, first, the profile 420 is moved relatively to the belt body 10 in a direction from the back surface 10y toward the inner surface 10x so that the protrusion 12 can be fitted to the recess portion 22, in the same manner as in the first embodiment. The profile 420 is disposed thus on the back surface 10y. After that, the fixation member precursor 430x as described above is moved in a direction from the one end side (end portions where the connection portion 32 is provided) of the two extension portions 31 in the belt longitudinal direction toward the other end side, and inserted in the belt longitudinal direction from a lateral side of the profile 420 so as to penetrate the profile 420 and the protrusion 12. Further after that, the expansion portions 33 are formed as described above and the fixation member 430 having the expansion portions 33 at the other ends of the respective extension portions 31 in the belt longitudinal direction is produced so that the profile 420 is fixed to the belt body 10.

In order to remove the profile 420 from the belt body 10, first, the two expansion portions 33 provided in the fixation member 430 are bent to extend in the belt longitudinal direction, and the fixation member 430 having no expansion portions 33 is moved relatively to the profile 420 in a direction from the other end side of the two extension portions 31 in the belt longitudinal direction toward the one end side (the end portions where the connection portion 32 is provided). Thus, the fixation member 430 is extracted to the outside of the profile 420. After that, the profile 420 is moved relatively to the belt body 10 in a direction from the inner surface 10x toward the back surface 10y so that the profile 420 is separated from the belt body 10. As a result, the profile 420 is removed from the belt body 10.

As described above, according to the embodiment, similar effects to those of the first to third embodiments based on the similar configuration to those of the first to third embodiments can be obtained.

Next, a profiled belt 501 according to a fifth embodiment of the present invention will be described with reference to FIG. 7. Constituent elements the same as those in the first embodiment will be referenced correspondingly, and their description will be omitted accordingly.

The profiled belt 501 includes a belt body 10, a plurality of profiles 520 provided on a back surface 10y of the belt body 10, and a fixation member 530 for detachably fixing the profile 520 to the belt body 10.

Each fixation member 530 is a rod-like member made of metal (such as iron or aluminum) in the same manner as in the first embodiment and includes one extension portion 31. Although the extension portion 31 extends in the belt longitudinal direction in the first embodiment, the extension portion 31 extends in the belt width direction in the fifth embodiment. The length of each protrusion 12 is longer in the belt width direction than in the belt longitudinal direction.

The fixation member 530 does not protrude from an external surface of the profile 520, in the same manner as in the first embodiment.

In order to attach the profile 520 to the belt body 10, first, the profile 520 is moved relatively to the belt body 10 in a direction from the back surface 10y toward the inner surface 10x so that the protrusion 12 can be fitted to the recess portion 22, in the same manner as in the first embodiment. The profile 520 is disposed thus on the back surface 10y. After that, the fixation member 530 is inserted in the belt width direction from a lateral side of the profile 520 so as to penetrate the profile 520 and the protrusion 12. As a result, the profile 520 is fixed to the belt body 10.

In order to remove the profile 520 from the belt body 10, first, the fixation member 530 is moved relatively to the profile 520 in the belt width direction. Thus, the fixation member 530 is extracted to the outside of the profile 520. After that, the profile 520 is moved relatively to the belt body 10 in a direction from the inner surface 10x toward the back surface 10y so that the profile 520 is separated from the belt body 10. As a result, the profile 520 is removed from the belt body 10.

As described above, according to the embodiment, the following effects can be obtained as well as similar effects to those of the first embodiment based on the similar configuration to that of the first embodiment.

The protrusion 12 is longer in one direction of the belt longitudinal direction and the belt width direction (the belt width direction in the embodiment) than in the other direction (the belt longitudinal direction in the embodiment). The parallel direction as the direction in which the extension portion 31 extends corresponds to the one direction (belt width direction).

According to the aforementioned configuration, the extension portion 31 is extended in the longitudinal direction of the protrusion 12 so that the holding force of the profile 520 to the protrusion 12 can be improved as compared with a case where the extension portion 31 is extended in the lateral direction of the protrusion 12.

Next, a profiled belt 601 according to a sixth embodiment of the present invention will be described with reference to the part (a) and the part (b) of FIG. 8. Constituent elements the same as those in the first, third or fifth embodiment will be referenced correspondingly, and their description will be omitted accordingly.

The profiled belt 601 includes a belt body 10, a plurality of profiles 620 provided on a back surface 10y of the belt body 10, and a fixation members 630 for detachably fixing the profile 620 to the belt body 10.

The fixation member 630 is a rod-like member made of metal (such as iron or aluminum) in the same manner as in the first, third or fifth embodiment and includes one extension portion 31. In the embodiment, the extension portion 31 extends in the belt width direction in the same manner as in the fifth embodiment. The protrusion 12 is longer in the belt width direction than in the belt longitudinal direction.

The fixation member 630 further includes expansion portions 33 provided on both ends of the extension portion 31 in a parallel direction (corresponding to the belt longitudinal direction in the embodiment). The both ends of the extension portion 31 are not connected to any other elements.

Each expansion portion 33 has a size in a perpendicular direction (corresponding to the belt longitudinal direction and/or the belt thickness direction in the embodiment) perpendicular to the parallel direction being larger at least in a part to be connected to the end portion (one end or the other end of the extension portion 31 in the belt width direction) than a size (the diameter of the extension portion 31) of the end portion in the perpendicular direction. The expansion portion 33 provided at one end (left deep side in the part (a) of FIG. 8) of the extension portion 31 in the belt width direction has a shape of a truncated cone whose bottom surface is a circle having a larger diameter than the diameter of the extension portion 31. That is, the size of the expansion portion 33 in the perpendicular direction is reduced as going in the parallel direction (corresponding to the belt width direction in the embodiment) away from one end of the extension portion 31 in the belt width direction. The size D33 (the diameter of the upper surface of the truncated cone) in the perpendicular direction of the expansion portion at the furthest end in the parallel direction from the end portion of the extension portion is equal to the size D31 (the diameter of the extension portion 31) of the extension portion in the perpendicular direction or smaller than the size (see the part (b) of FIG. 8). The expansion portion 33 provided at the other end (right front side in the part (a) of FIG. 8) of the extension portion 31 in the belt width direction has a columnar shape having a larger diameter than the diameter of the extension portion 31.

The profile 620 has, in addition to a recess portions 22, an expansion portion receiving portions 323 that receive the extension portions 33. The expansion portion receiving portions 323 are open to both side surfaces (two side surfaces extending in the belt longitudinal direction) of the profile 620 in the belt width direction.

The fixation member 630 does not protrude from an external surface of the profile 620, in the same manner as in the first, third or fifth embodiment.

In order to attach the profile 620 to the belt body 10, first, the profile 620 is moved relatively to the belt body 10 in a direction from the back surface 10y toward the inner surface 10x so that the protrusion 12 can be fitted to the recess portion 22, in the same manner as in the fifth embodiment. The profile 620 is disposed thus on the back surface 10y. After that, the fixation member 630 is inserted in the belt width direction from a lateral side of the profile 620 so that an end (the part reduced in diameter) of the expansion portion 33 on the left deep side in the part (a) of FIG. 8 can serve as a head. Thus, the fixation member 630 is made to penetrate the profile 620 and the protrusion 12. As a result, the profile 620 is fixed to the belt body 10.

In order to remove the profile 620 from the belt body 10, first, the end (the part reduced in diameter) of the expansion portion 33 on the left deep side in the part (a) of FIG. 8 is pressed in a direction from one end (an end portion where the expansion portion 33 on the left deep side in the part (a) of FIG. 8 is provided) of the extension portion 31 in the belt width direction toward the other end (an end portion where the expansion portion 33 on the right front side in the part (a) of FIG. 8 is provided), so that the fixation member 630 can be moved relatively to the profile 620 in the belt width direction. Thus, the fixation member 630 is extracted to the outside of the profile 620. After that, the profile 620 is moved relatively to the belt body 10 in a direction from the inner surface 10x toward the back surface 10y so that the profile 620 is separated from the belt body 10. As a result, the profile 620 is removed from the belt body 10.

When the fixation member 630 is made to penetrate the profile 620 and the protrusion 12, and when the fixation member 630 is extracted from the profile 620 and the protrusion 12, a wall defining a through hole formed in the protrusion 12 is pushed by the expansion portion 33 and thereby the through hole of the protrusion 12 is slightly enlarged. However, after the expansion portion 33 passes through the through hole, the size of the through hole returns to its original size due to the elasticity of the material of the protrusion 12 (that is, the material of the belt body 10).

As described above, according to the embodiment, the following effects can be obtained as well as similar effects to those of the first, third or fifth embodiment based on the similar configuration to that of the first, third or fifth embodiment.

The size of the expansion portion 33 on the left deep side in the part (a) of FIG. 8 in the perpendicular direction (corresponding to the belt longitudinal direction and/or the belt thickness direction in the embodiment) is reduced as going in the parallel direction (corresponding to the belt width direction in the embodiment) away from an end portion of the extension portion 31. The size D33 in the perpendicular direction of the expansion portion at the furthest end in the parallel direction from the end portion of the extension portion is equal to the size D31 of the extension portion in the perpendicular direction or smaller than the size (see the part (b) of FIG. 8).

According to the aforementioned configuration, it is possible to easily perform work of inserting the fixation member 630 into the profile 620 and the protrusion 12 from the end of the expansion portion 33, and hence it is possible to easily perform work of attaching the profile 620 to the belt body 10.

Next, an embodiment of a method for manufacturing a profiled belt according to the present invention will be described with reference to FIG. 9.

The manufacturing method according to the embodiment includes a belt body production step S1 of producing a belt body 10 including a protrusion 12 on a back surface 10y, a profile production step S2 of producing a profile 20, 220, 320, 420, 520 or 620 having a recess portion 22 to which the protrusion 12 is fitted, and a fixation step S3 of fixing the profile 20, 220, 320, 420, 520 or 620 to the belt body 10 by use of a fixation member 30, 230, 330, 430, 530 or 630 in a state where the protrusion 12 has been fitted to the recess portion 12.

The materials of the belt body 10, the profile 20, 220, 320, 420, 520 or 620 and the fixation member 30, 230, 330, 430, 530 or 630, and specific methods for producing the belt body 10 and the profile 20, 220, 320, 420, 520 or 620 have been described above in the aforementioned embodiments.

In the embodiment, in the belt body production step S1, a through hole to be penetrated by the fixation member 30, 230, 330, 430, 530 or 630 is formed in the protrusion 12. In addition, in the profile production step S2, the through hole to be penetrated by the fixation member 30, 230, 330, 430, 530 or 630 is formed in the profile 20, 220, 320, 420, 520 or 620.

In the fixation step S3, the fixation member 30, 230, 330, 430, 530 or 630 is removably inserted to the profile 20, 220, 320, 420, 520 or 620 and the protrusion 12 so that the profile 20, 220, 320, 420, 520 or 620 can be detachably fixed to the belt body 10 by the fixation member 30, 230, 330, 430, 530 or 630. Specific methods of the fixation step S3 have been described in the aforementioned embodiments.

As described above, according to the embodiment, similar effects to those of the first to sixth embodiments based on a similar configuration to those of the first to sixth embodiments can be obtained.

Although the preferred embodiments of the present invention have been described above, the present invention is not limited to the aforementioned embodiments, but various changes in design can be performed on the present invention within the scope of the claims.

The number of profiles provided on a belt may be any number not smaller than 1.

The shape and dimensions of each profile may be changed desirably. For example, the profile may be shorter than the belt body as to the belt width direction, or a side surface of the profile in the belt longitudinal direction (a side surface extending in the belt width direction) may be inclined with respect to the belt thickness direction, or a protrusion portion may be provided in a side surface in the belt longitudinal direction (a side surface extending in the belt width direction).

Each profile may have no connection portion receiving portion or no expansion portion receiving portion.

The number of protrusions provided in each profile is not limited to one, but two or more protrusions may be provided in each profile.

Each protrusion may be shorter than the belt body with respect to the belt width direction.

The present invention is not limited to a manner in which the protrusions are provided on the back surface by integral molding. For example, the protrusions may be bonded to the back surface by a bonding agent or the like.

The material of the protrusions or the profiles is not limited especially, but may be changed desirably.

The fixation members are not limited to the aforementioned form as long as the fixation members are removably inserted to the profiles and the protrusions and the profiles are detachably fixed to the belt body by the fixation members. For example, the fixation members may protrude from the external surfaces of the profiles. The material of the fixation members is not limited especially, but resin may be used for example. Each fixation member may include three or more extension portions. The extending direction of the extension portion may be either the belt longitudinal direction or the belt width direction, or may be a direction other than the belt longitudinal direction and the belt width direction (a direction crossing the two directions). Further, the extension portion may extend not in a parallel direction to the back surface but in the belt thickness direction. When the extension portion extends in the belt thickness direction, the fixation member is inserted in the belt thickness direction from above the profile (on the back surface side of the belt body) so as to penetrate the profile and not to penetrate the protrusion but to be partially inserted into the protrusion. An expansion portion formed to be reduced in diameter toward its end as shown in the expansion portion 33 on the left deep side in the part (a) of FIG. 8 may be provided in each of the both ends of the extension portion extending in the belt width direction. An expansion portion formed to be reduced in diameter toward its end as shown in the expansion portion 33 on the left deep side in the part (a) of FIG. 8 may be provided in an end portion of the extension portion extending in the belt longitudinal direction.

Through holes or recess portions to and from which the fixation members are inserted and removed do not have to be formed in advance in the profiles and the protrusions. In this case, the fixation members may be made up of a material higher in hardness than the profiles and the protrusions, or ends of the fixation members in their insertion directions to the profiles and the protrusions may be formed into edged shapes, so that through holes or recess portions can be formed in the profiles and the protrusions when the fixation members are inserted into the profiles and the protrusions for the first time.

In the sixth embodiment, the fixation member 630 having the expansion portion 33 is made to penetrate the profile 620 and the protrusion 12, or extracted from the profile 620 and the protrusion 12, but the present invention is not limited thereto. For example, as shown in the third embodiment, a fixation member precursor having no expansion portion 33 may be first produced, and the precursor is made to penetrate the profile 620 and the protrusion 12, and the both ends of the extension portion 31 of the precursor are pressed by a desired method to thereby form the expansion portions 33. Thus, the fixation member 630 may be produced. Alternatively, a member provided with only one of the expansion portions 33 may be prepared as a fixation member precursor. The precursor is made to penetrate the profile 620 and the protrusion 12, and an end portion of the extension portion 31 of the precursor where the expansion portion 33 has not been provided yet is pressed by a desired method to thereby form the other expansion portion 33. Thus, the fixation member 630 may be produced.

The present application is based on Japanese Patent Application No. 2015-099908 filed on May 15, 2015, and Japanese Patent Application No. 2015-130348 filed on Jun. 29, 2015, the contents of which are incorporated herein by reference.

DESCRIPTION OF REFERENCE NUMERALS AND SIGNS 1,201,301,401,501,601 profiled belt
10 belt body
10x inner surface
10y back surface
11 tooth
12 protrusion
20,220,320,420,520,620 profile
22 recess portion
222 connection portion receiving portion
30,230,330,430,530,630 fixation member
31 extension portion
32 connection portion
33 expansion portion
323 expansion portion receiving portion

The invention claimed is:

1. A profiled belt comprising: a belt body; a profile that is provided on a back surface of the belt body; and a fixation member that detachably fixes the profile to the belt body, wherein:
the belt body includes a protrusion integrally formed with and on the back surface in a thickness direction of the belt body, wherein the belt body, at a position where the protrusion is formed, does not include any through holes in the thickness direction;
the profile includes a recess portion in which an entirety of the protrusion is fitted such that surfaces of the protrusion, in a belt longitudinal direction, are entirely covered by the profile;
the fixation member fixes the profile to the belt body in a state where the entirety of the protrusion has been fitted into the recess portion; and
the fixation member is removably inserted to the profile and the protrusion.

2. The profiled belt according to claim 1, wherein the fixation member includes an extension portion that extends in a parallel direction parallel to the back surface and that penetrates the profile and the protrusion.

3. The profiled belt according to claim 2, wherein the fixation member comprises a plurality of the extension portions, and a connection portion that connects one ends of the plurality of the extension portions in the parallel direction.

4. The profiled belt according to claim 3, wherein the profile includes a connection portion receiving portion that receives the connection portion.

5. The profiled belt according to claim 2, wherein:
the protrusion is longer in one direction of a longitudinal direction and a width direction of the belt body than in another direction; and
the parallel direction is the one direction.

6. The profiled belt according to claim 2, wherein the fixation member further comprises an expansion portion that is provided in an end portion of the extension portion in the parallel direction, the end portion being not connected to another element, and that has a size in a perpendicular direction perpendicular to the parallel direction being larger at least in a part to be connected to the end portion than a size of the end portion in the perpendicular direction.

7. The profiled belt according to claim 6, wherein: expansion portion receiving portion that receives the expansion portion.

8. The profiled belt according to claim 6, wherein:
the expansion portion has a size in the perpendicular direction being reduced as going in the parallel direction away from the end portion of the extension portion; and
the size in the perpendicular direction of the expansion portion at the furthest end in the parallel direction from the end portion of the extension portion is equal to the size of the extension portion in the perpendicular direction or smaller than said size.

9. The profiled belt according to claim 6, wherein the fixation member is made of metal.

10. The profiled belt according to claim 1, wherein the fixation member does not protrude from an external surface of the profile.

* * * * *